United States Patent
Masuda

(10) Patent No.: US 6,989,340 B2
(45) Date of Patent: Jan. 24, 2006

(54) LEAD-FREE LOW SOFTENING POINT GLASS

(75) Inventor: Hirohisa Masuda, Osaka (JP)

(73) Assignee: Tokan Material Technology Co., Ltd., Osaka (JP)

( * ) Notice: Subject to any disclaimer, the term of this patent is extended or adjusted under 35 U.S.C. 154(b) by 0 days.

(21) Appl. No.: 10/842,763

(22) Filed: May 11, 2004

(65) Prior Publication Data

US 2005/0255985 A1    Nov. 17, 2005

(51) Int. Cl.
*C03C 3/16* (2006.01)
(52) U.S. Cl. ............................. 501/45; 501/17; 501/24
(58) Field of Classification Search ............ 501/45–48, 501/24, 17
See application file for complete search history.

(56) References Cited

U.S. PATENT DOCUMENTS

| | | | |
|---|---|---|---|
| 2,400,147 A * | 5/1946 | Hooley | 252/301.6 R |
| 5,246,890 A | 9/1993 | Aitken et al. | |
| 5,281,560 A | 1/1994 | Francis et al. | |
| 6,306,783 B1 * | 10/2001 | Yamanaka | 501/15 |
| 2002/0019303 A1 * | 2/2002 | Yamanaka | 501/17 |

FOREIGN PATENT DOCUMENTS

| | | | |
|---|---|---|---|
| JP | 09-235136 | | 9/1997 |
| JP | 2001158640 A | * | 6/2001 |
| JP | 2001199740 A | * | 7/2001 |

OTHER PUBLICATIONS

Machine translation of JP 09-235136, Sep. 1997.*
J. Japan Inst. Metals, vol. 63, No. 3 (1999), pp. 284-288.

* cited by examiner

*Primary Examiner*—David Sample
(74) *Attorney, Agent, or Firm*—Jordan and Hamburg LLP

(57) ABSTRACT

Disclosed is a lead-free low softening point glass whose composition lies within the system $SnO$—$P_2O_5$ and containing over 5 to 30 mol % of MnO. The addition of MnO allows the water resistance and coefficient of thermal expansion of the glass to be improved without spoiling its feature of a low softening point. The lead-free low softening point glass can be prepared through a simplified production process.

2 Claims, No Drawings

LEAD-FREE LOW SOFTENING POINT GLASS

BACKGROUND OF THE INVENTION

1. Field of the Invention

The present invention relates to a lead-free low softening point glass in the system $SnO\text{-}P_2O_5$.

2. Description of the Background Art

Heretofore, a low softening point glass in the system $PbO\text{-}B_2O_3\text{—}SiO_2$ has been widely used as a primary composition of adhesives for glass, ceramic or metal materials; sealing or coating glasses for electronic components; or conductive or resistive pastes. In late years, it has also been used as a material of the glass substance for a plasma display panel (PDP) or a vacuum fluorescent display (VFD).

In this context, the recent concern over the risk of lead toxicity to the human body develops a tendency to restrict the use of PbO contained in the low softening point glass.

As lead-free low softening point glasses substituting for the PbO-containing glass, there have been known $BaO\text{-}B_2O_3\text{—}ZnO$ glass system as proposed in the Journal of the Japan Institute of Metals, Vol. 63 (1999), pp 284, and $Bi_2O_3\text{—}B_2O_3\text{—}SiO_2$ glass system. U.S. Pat. Nos. 5,246,890 and 5,281,560 also disclose $ZnO\text{—}SnO\text{-}P_2O_5$ glass system.

Among these lead-free low softening point glasses, the $BaO\text{-}B_2O_3\text{—}ZnO$ glass system and $Bi_2O_3\text{—}B_2O_3\text{—}SiO_2$ glass system have a problem on a higher softening point than that of the conventional lead-containing glass. Thus, these glasses have to rely on the addition of an alkali metal oxide ($R_2O$) to obtain the same level of softening point as that of the conventional lead-containing glass, and the addition of $R_2O$ is likely to cause side issues in terms of water resistance, thermal expansion properties and/or electric properties. In addition, some of the BaO or $Bi_2O_3$-containing glasses are potentially harmful to the human body.

The $ZnO\text{—}SnO\text{-}P_2O_5$ glass system with a softening point equal to or lower than that of conventional lead-containing glass have been regarded as a dominant material among the lead-free low softening point glasses.

On the other hand, the $ZnO\text{—}SnO\text{-}P_2O_5$ system glasses involve a problem peculiar to a phosphate-based glass, such as poor water resisting property or large coefficient of thermal expansion. Furthermore, SnO is easily oxidized to form $SnO_2$, and thereby unmeltable tin-phosphate compound ($SnP_2O_7$) are apt to be undesirably formed during the glass melting process under an ambient atmosphere.

While a trivalent cation oxide, such as aluminum oxide ($Al_2O_3$), iron oxide ($Fe_2O_3$), gallium oxide ($Ga_2O_3$) or antimony oxide ($Sb_2O_3$), may be added thereto to improve the water resisting property, the addition of such an oxide will cause a new problem of the deterioration in low softening point as the prime advantage of this system. As a measure for reducing the coefficient of thermal expansion, a filler with a coefficient of thermal expansion lower than that of the glass may be added to the glass at an amount proportional to the level of the coefficient of thermal expansion thereof. However, if the glass has a fairly high coefficient of thermal expansion, the filler added at a larger amount will cause the need for increasing the temperature of a heat treatment, and consequently spoil the advantage of the low softening point. Further, in order to suppress the formation of tin-phosphate compound, the melting process has to be performed under the condition of an inert atmosphere, a two-stage temperature control and/or the addition of a reducing agent. The resulting complicated melting process will lead to instability in the production process.

Japanese Patent Laid-Open publication No. 09-235136 also discloses a lead-free low-softening-point glass composition for use in sealing PDP or VFD, comprising 0 to 5 mol % of MnO contained in phosphorous and tin oxides. In this publication, the MnO is added together with CuO, NiO, CoO, $Fe_2O_3$, $Bi_2O_3$ and others to provide enhanced bonding strength. That is, it is not intended to add the MnO at a sufficient amount (mol %) as an essential component for directly contributing to improvement in water resistance and coefficient of thermal expansion.

SUMMARY OF THE INVENTION

In view of the above circumstances, it is therefore an object of the present invention to provide an improved low softening point glass in the system $SnO\text{-}P_2O_5$ devoid of lead which is a harmful substance.

It is another object of the present invention to provide a lead-free low softening point glass in the system $SnO\text{-}P_2O_5$, which is improved in water resistance and coefficient of thermal expansion without deterioration in the advantageous low softening point thereof.

It is yet another object of the present invention to provide a lead-free low softening point glass in the system $SnO\text{-}P_2O_5$, which is capable of being prepared through a simplified production process.

It is still another object of the present invention to provide a lead-free low softening point glass in the system $SnO\text{-}P_2O_5$, which is capable of being obtained through a conventional glass preparation method, and suitable for use in adhesives for glass, ceramic or metal materials, sealing or coating glasses for electronic components, conductive or resistive pastes, or glass substances for PDP or VFD.

It is yet still another object of the present invention to provide a lead-free low softening point glass in the system $SnO\text{-}P_2O_5$, which is suitable for use in producing an electronic component incapable of being subjected to a heat treatment at a high temperature, or producing a composite material with an organic material.

It is another further object of the present invention to provide a lead-free low softening point glass in the system $SnO\text{-}P_2O_5$, which is applicable to create a new functional material in combination with an organic material, as well as conventional applications, such as adhesives for glass, ceramic or metal materials, sealing or coating glasses for electronic components, conductive or resistive pastes, and glass substances for PDP or VFD.

In order to achieve the above object, the present invention provides a lead-free low softening point glass in the Sn oxide-P oxide system, which contains a Mn oxide serving as a water-resistance and coefficient-of-thermal-expansion improver for the glass.

In the present invention, Mn oxide added into the lead-free low softening point glass can provide enhanced water resistance and reduced coefficient of thermal expansion. It is believed that these effects can be obtained through the mechanism where a part of MnO is changed into $Mn_2O_3$ serving as a trivalent cation oxide, and the $Mn_2O_3$ is incorporated into a network structure composed of $P_2O_5$ to allow the structure to be strengthened.

It is also believed that a manganese ion with a higher oxidation number has an effect of suppressing the change in valence of a tin ion. Consequently, a stable melted material can be obtained while suppressing the formation of unmeltable compounds, so as to provide $SnO\text{-}P_2O_5$ glass system without spoiling their advantageous feature or a low softening point.

In the lead-free low softening point glass of the present invention, the starting material of the Mn oxide may include $MnO_2$, MnO and $MnCO_3$. Among these starting materials, $MnO_2$ is not too desirable because it is apt to oxidize SnO to form $SnO_2$ which reacts with $P_2O_5$ to form an unmeltable compound ($SnP_2O_7$). Thus, the starting material of the Mn oxide is preferably MnO, more preferably $MnCO_3$ in view of easiness of melting because it has a lower thermal decomposition temperature.

In order to obtain enhanced water resistance and reduced coefficient of thermal expansion, it is required to add over 5 mol % of Mn oxide, provided that the mol % is calculated as an equivalent mol % of MnO. However, Mn oxide added in an amount of greater than 30 mol % will cause an adverse affect where crystallization is likely to occur during preparation of the glass or during a heat treatment for sealing or coating with the glass.

The starting material of the Sn oxide may include $SnO_2$, metastannic acid and SnO. In view of easiness in melting, metastannic acid having a lower thermal decomposition temperature is superior to $SnO_2$. More preferably, SnO is used as the starting material of the Sn oxide to effectively prevent the formation of an unmeltable compound ($SnP_2O_7$) resulting from the reaction between $P_2O_5$ and $SnO_2$.

While the starting material of the P oxide may include $P_2O_5$, $H_3PO_4$ and $NH_4H_2PO_4$, it is preferable to use an ammonium salt of phosphoric acid [monobasic ammonium phosphate: ammonium dihydrogen phosphate ($NH_4H_2PO_4$), or dibasic ammonium phosphate: diammonium hydrogen phosphate (($NH_4)_2HPO_4$)] because it is a solid, and a reducing gas to be generated during its decomposition can suppress the oxidation of SnO (or the formation of $SnO_2$).

In order to adjust at least one of its softening point, coefficient of thermal expansion, crystallization temperature, wettability to another material, and adhesiveness to another material, during preparation of the lead-free low softening point glass of the present invention, one or more additives selected from the group consisting of an alkali metal compound, an alkali earth metal compound; a transition metal compound; a trivalent cation oxide, such as aluminum oxide ($Al_2O_3$), iron oxide ($Fe_2O_3$), gallium oxide ($Ga_2O_3$) or antimony oxide ($Sb_2O_3$) may be added thereto in a total amount of 10 mol % or less, within the range for preventing excessive increase in the softening point and the coefficient of thermal expansion, and excessive deterioration in the water resistance.

The lead-free low softening point glass of the present invention can be prepared through a conventional glass production technique without using any particular process.

As the starting material for each component constituting the lead-free low softening point glass, each component constituting the glass itself or a compound for producing the component can be used.

Alternatively, various phosphates containing the elemental component may be used as the starting material. In this case, the glass can be prepared while preventing the component from being volatilized, so as to reduce the variation in composition.

The material of a vessel for use in the melting process is not limited to a specific one, but any suitable material, such as metal, quartz, alumina, mullite-based material or carbonaceous material, may be used. While the vessel for use in the melting process may have a cover or may not have any cover, it is preferable to have no cover in view of facilitating the release of decomposed gas.

While the melting process may be performed in an inert atmosphere, it is preferably performed in an ambient atmosphere to simplify the production process.

When the glass prepared in the above manner is actually used in sealing or the like, the glass composition of the present invention may be mixed with a filler to have a coefficient of thermal expansion conformable to that of a substrate to be sealed. The filler is not limited to a specific type or amount, but any suitable type of filler may be mixed in an amount allowing the original characteristics of the glass to be adequately maintained.

DESCRIPTION OF THE PREFERRED EMBODIMENTS

Example I

Various oxides were added to the binary $SnO$-$P_2O_5$ system which is a fundamental composition of a lead-free low softening point glass of the present invention, to check out their resulting effects of improving water resistance.

Raw powders of SnO and $P_2O_5$ (SnO and $NH_4H_2PO_4$) were first blended to prepare a raw material having a composition of 60 mol % SnO—40 mol % $P_2O_5$. Then, each of oxides as shown in Table 1 was added to the raw material in an amount of 5 mol %. The obtained mixture was melted at 1100° C. for 30 minutes, and then rapidly quenched to obtain a glass frit.

The frit was ground to a powder having a mean particle diameter of about 5 μm through a dry process using a ball mill. The glass powder was put in a ceramic crucible, and hermetically enclosed in a vessel containing water. The inner atmosphere of the vessel has a temperature of 25° C. The glass powder was maintained under this condition for 5 days, and then the water resistance of the glass was evaluated based on the change in weight of the glass powder.

As the result of the evaluation, it was proved that MnO, $Al_2O_3$, $Fe_2O_3$, $Ga_2O_3$ and $Sb_2O_3$ among the added oxides have the effect of improving the water resistance, as shown in the following Table 1. It was also proved that while the glass added with either one of $Al_2O_3$, $Fe_2O_3$, $Ga_2O_3$ and $Sb_2O_3$ has enhanced water resistance, it has a significantly increased softening point in proportion to the added amount, and thereby its application to a low softening point glass is limited. By contrast, the glass added with ZnO (the glass in the system ZnO—SnO-$P_2O_5$) as a subject of various previous researches exhibited poor water resistance.

Considering all the above evaluation results, it was verified that the glass in the MnO—SnO-$P_2O_5$ system, which is prepared by adding MnO to the fundamental glass whose composition lies within the SnO-$P_2O_5$ system, can achieve significantly improved water resistance while minimizing the increase in softening point.

Example II

The composition of the glass in the system MnO—SnO-$P_2O_5$ was checked up as follows.

A glass frit in the system MnO—SnO-$P_2O_5$ was prepared by mixing respective elemental components ($MnCO_3$, SnO and $NH_4H_2PO_4$), melting the mixture in an ambient atmosphere at 1100° C. for 30 minutes, and then rapidly quenched to obtain a glass frit. The composition comprising 20 mol % or less of $P_2O_5$ resulted in no formation of glass. The glass containing 50 mol % or more of $P_2O_5$ has deteriorated water resistance immediately after the preparation due to its high hygroscopic property.

The composition comprising 30 mol % or less of SnO and 30 mol % or more of MnO was apt to cause crystallization during preparation of the glass or during a heat treatment for sealing or coating with the glass.

Table 2 shows the evaluation result of the properties of Inventive Examples whose composition lies within the ternary $MnO—SnO-P_2O_5$ system, and Comparative Examples whose composition lies within the binary $SnO-P_2O_5$ system and the ternary $ZnO—SnO-P_2O_5$ system.

The water resistance in Table 2 was evaluated based on the change in weight of glass powder having a mean particle diameter of about 5 μm, under the condition of 35° C. and 70% relative humidity (RH). As seen in Table 2, Inventive Examples 1 to 4 added with MnO have enhanced water resistance, and whereas Comparative Examples 1 and 2 in the binary $SnO-P_2O_5$ system have poor water resistance.

Moreover, as seen in Table 2, Inventive Examples 1 to 4 added with MnO have reduced the coefficient of thermal expansion, and whereas Comparative Examples 1 and 2 in the binary $SnO-P_2O_5$ system have relatively higher coefficient of thermal expansion.

This result shows that MnO is an essential component to improve the water resistance and the coefficient of thermal expansion of binary $SnO—P_2O_5$ glass system. Further, it is verified that MnO is required to be added in an amount of over 5 mol %.

Through the above evaluation, it was found that there is a particular composition in the $MnO—SnO—P_2O_5$ glass system of the present invention, which achieves enhanced water resistance and approximately the same coefficient of thermal expansion (α) even though it exhibits a slightly higher softening point (DSP: Dilatometric Softening Point), as compared with the conventional $ZnO—SnO—P_2O_5$ glass system as in Comparative Examples 3 to 6. This optimal composition comprises 30 to 70 mol % of SnO, 20 to 50 mol % of $P_2O_5$, and over 5 to 30 mol % of MnO.

Example III

A coefficient-of-thermal-expansion-reducing filler was mixed with the glass composition of the present invention to check up the resulting effect.

Generally, the $MnO—SnO-P_2O_5$ glass system still have a larger coefficient of thermal expansion, compare to the $PbO-B_2O_3—SiO_2$ glass system. Thus, it is required to reduce such a coefficient of thermal expansion to allow the $MnO—SnO-P_2O_5$ glass system to be used for the same purposes as those of the $PbO-B_2O_3—SiO_2$ glass system. By way of example, β-spodumene serving as a coefficient-of-thermal-expansion-reducing filler was mixed with the glass in the $MnO—SnO-P_2O_5$ system in an amount of 20 wt % and in an amount of 30 wt % to prepare Inventive Examples 5 and 6, respectively. Then, the properties of Inventive Examples 5 and 6 were measured.

The measured properties of Inventive Examples 5 and 6 are shown in Table 2. Each of the glasses of Inventive Examples 5 and 6 was finished in the form of pellets, and the glass pellets were burnt at 430° C. while placing them on a conventional soda-lime glass plate. The glass pellets were softened and adequately spread over the glass plate. Further, after hardening of the softened glass, neither the glass plate nor the glass layer formed thereon had any fiacture likely to be caused by residual stress in the interface therebetween. This proves that the $MnO—SnO-P_2O_5$ glass system mixed with an appropriately selected filler can be used for the same purposes as those of the commonly used $PbO-B_2O_3—SiO_2$ system glasses. While this example has employed β-spodumene as the filler, the filler is not limited thereto.

Example IV

An additive was mixed with the glass composition of the present invention within the range for preventing excessive increase in the softening point and the coefficient of thermal expansion, and excessive deterioration in the water resistance, to check up the resulting effect. Further, a coefficient-of-thermal-expansion-reducing filler was mixed with the obtained glass to check up the resulting effect.

Specifically, each of $Li_2O$ and $Na_2O$ was added to the composition: 10 MnO-50 SnO-40 $P_2O_5$ (mol %) of Inventive Example 1 in Table 2, in an amount of 5 mol % with respect to 100 mol % of the composition to prepare Inventive Example 7. Further, 25 wt % of cordierite serving as the coefficient-of-thermal-expansion-reducing filler was added to the composition of Inventive Example 7 to prepare Inventive Example 8. Then, the properties of Inventive Examples 7 and 8 were evaluated. The evaluation result is shown in Table 2. Each of Examples 7 and 8 exhibited approximately the same water resistance as that of Inventive Example 1.

As seen in Inventive Example 7, the addition of $Li_2O$ and $Na_2O$ allows the softening point to be reduced without change in water resistance and coefficient of thermal expansion.

While this example has employed $Li_2O$ and $Na2O$ as the additive, the type of the additive is not limited to $Li_2O$ and $Na_2O$, but any other suitable additive including an alkali metal compound, an alkali earth metal compound; a transition metal compound; a trivalent cation oxide, such as aluminum oxide ($Al_2O_3$), iron oxide ($Fe_2O_3$) gallium oxide ($Ga_2O_3$) or antimony oxide ($Sb_2O_3$), maybe used. While the amount of the one or more additives is not limited to a specific value, it is preferable to be added in a total amount of 10 mol % or less in view of maintaining the original characteristics of the glass in the $MnO—SnO-P_2O_5$ system.

Further, as seen in Inventive Example 8, the addition of the thermal-expansion-coefficient-reducing filler allows the coefficient of thermal expansion to be reduced without increase in softening point.

The glass mixed with cordierite as in Inventive Example 8 was finished in the form of pellets, and the glass pellets were burnt at 370° C. while placing them on a conventional soda-lime glass plate. The glass pellets were softened and adequately spread over the glass plate. Further, after hardening of the softened glass, neither the glass plate nor the glass layer formed thereon had any fracture likely to be caused by residual stress in the interface therebetween. While this example has employed cordierite as the filler, the filler is not limited thereto.

TABLE 1

| Water Resistance (mol %) | ΔW (%) After 5 days |
|---|---|
| $60SnO—40P_2O_5$ Added Oxide | 22.8 |
| +5$Li_2O$ | 20.0 |
| +5MgO | 17.4 |
| +5$WO_3$ | 13.1 |
| +5MnO | 3.4 |
| +5CoO | 11.1 |
| +5NiO | 14.1 |
| +5ZnO | 18.7 |
| +5$Al_2O_3$ | 2.2 |
| +5$Fe_2O_3$ | 2.1 |
| +5$Ga_2O_3$ | 2.7 |
| +5$Sb_2O_3$ | 7.3 |

TABLE 2

| | Composition (mol %) | α (×10⁻⁷) | DSP (°C.) | Tg (°C.) | Td (°C.) | Ts (°C.) | Water Resistance (ΔW %) After 1 day | After 2 days | After 1 week |
|---|---|---|---|---|---|---|---|---|---|
| Inventive Example | | | | | | | | | |
| 1 | 10MnO—50SnO—40P$_2$O$_5$ | 12.8 | 304 | 288.3 | 306.6 | 315.8 | 1.05 | 3.73 | x |
| 2 | 10MnO—60SnO—30P$_2$O$_5$ | 12.1 | 315 | 299.1 | 329.5 | 354.3 | 0.14 | 0.21 | 0.42 |
| 3 | 20MnO—40SnO—40P$_2$O$_5$ | 11.7 | 324 | 321.4 | 342.0 | 359.9 | 0.49 | 1.40 | x |
| 4 | 20MnO—50SnO—30P$_2$O$_5$ | 11.0 | 350 | 329.8 | 360.3 | 388.3 | 0.10 | 0.14 | 0.24 |
| 5 | Inventive Example 1 + filler | 9.5 | 323 | (Adding 20 wt % of β-spodumene to Inventive Example 1) | | | | | |
| 6 | Inventive Example 1 + filler | 7.6 | 329 | (Adding 30 wt % of β-spodumene to Inventive Example 1) | | | | | |
| 7 | Inventive Example 1 + (5Li$_2$O + 5Na$_2$O) | 12.7 | 297 | | | | | | |
| 8 | Inventive Example 7 + filler | 7.6 | 298 | (Adding 25 wt % of Cordierite to Inventive Example 7) | | | | | |
| Comparative Example | | | | | | | | | |
| 1 | 0MnO—60SnO—40P$_2$O$_5$ | 13.9 | (Any powder having adequate water resistance for use in the evaluation of properties could be obtained) | | | | | | |
| 2 | 0MnO—70SnO—30P$_2$O$_5$ | 13.6 | (Any powder having adequate water resistance for use in the evaluation of properties could be obtained) | | | | | | |
| 3 | 10ZnO—50SnO—40P$_2$O$_5$ | 13.4 | 285 | 277.7 | 290.0 | 296.9 | 6.80 | x | x |
| 4 | 10ZnO—60SnO—30P$_2$O$_5$ | 11.9 | 325 | 286.9 | 317.3 | 340.7 | 0.20 | 0.28 | 0.51 |
| 5 | 20ZnO—40SnO—40P$_2$O$_5$ | 11.9 | 309 | 292.0 | 307.3 | 318.9 | 3.19 | 10.0 | x |
| 6 | 20ZnO—50SnO—30P$_2$O$_5$ | 10.2 | 339 | 304.4 | 334.8 | 363.1 | 0.10 | 0.15 | 0.29 |

What is claimed is:

1. A lead-free low softening point glass of an Sn oxide—P oxide system consisting of 30 to 70 mol % of SnO, 20 to 50 mol % of P$_2$O$_5$, and over 5 to 30 mol % of MnO.

2. The lead-free low softening point glass as defined in claim 1, which includes a filler mixed therewith.

* * * * *